(12) United States Patent
Sarin (10) Patent No.: US 11,334,932 B2
(45) Date of Patent: May 17, 2022

(54) COMMUNICATING PURCHASE REQUESTS TO OFFLINE DEVICES

(71) Applicant: PAYPAL, INC., San Jose, CA (US)

(72) Inventor: Pankaj Sarin, Elkhorn, NE (US)

(73) Assignee: PAYPAL, INC., San Jose, CA (US)

( * ) Notice: Subject to any disclaimer, the term of this patent is extended or adjusted under 35 U.S.C. 154(b) by 872 days.

(21) Appl. No.: 15/855,945

(22) Filed: Dec. 27, 2017

(65) Prior Publication Data
US 2019/0197594 A1 Jun. 27, 2019

(51) Int. Cl.
*G06Q 30/00* (2012.01)
*G06Q 30/06* (2012.01)
*G06Q 50/00* (2012.01)

(52) U.S. Cl.
CPC ..... *G06Q 30/0613* (2013.01); *G06Q 30/0609* (2013.01); *G06Q 30/0637* (2013.01); *G06Q 50/01* (2013.01)

(58) Field of Classification Search
CPC . G06Q 30/0601–0645; G06Q 30/0613; G06Q 30/0609; G06Q 30/0637; G06Q 50/01
USPC ................................. 705/26.1–27.2
See application file for complete search history.

(56) References Cited

U.S. PATENT DOCUMENTS

| | | | | |
|---|---|---|---|---|
| 9,311,685 | B2 * | 4/2016 | Harkey | G06Q 50/10 |
| 10,049,349 | B1 * | 8/2018 | Grassadonia | G06Q 20/10 |
| 10,366,378 | B1 * | 7/2019 | Han | G06Q 20/401 |
| 2012/0158589 | A1 * | 6/2012 | Katzin | G06Q 20/384 |
| | | | | 705/44 |
| 2016/0210602 | A1 * | 7/2016 | Siddique | G06Q 20/384 |
| 2016/0314449 | A1 * | 10/2016 | Shmilovitz | G06Q 20/202 |
| 2017/0076275 | A1 * | 3/2017 | Mutisya | G06Q 20/367 |

OTHER PUBLICATIONS

Iyengar, Raghuram, Sangman Han, and Sunil Gupta. "Do friends influence purchases in a social network?." Harvard Business School Marketing Unit Working Paper 09-123 (2009).*

* cited by examiner

*Primary Examiner* — Kathleen Palavecino
(74) *Attorney, Agent, or Firm* — Haynes and Boone, LLP (57) ABSTRACT

A method includes receiving, by a payment provide server of a payment provider from a point-of-sale (POS) device associated with a first merchant at a merchant location, a checkout request for a first user to purchase one or more items sold by the first merchant. The method further includes accessing an account of the first user with the payment provider based on authentication information included in the checkout request and identifying a previously stored payment token that is associated with the account of the first user, the previously stored payment token indicating one or more additional items for potential purchase. Further, the method includes in response to the identifying, transmitting instructions to the POS device that cause the POS device to display a request for the first user to add at least one of the one or more additional items for potential purchase for checkout at the merchant location.

20 Claims, 5 Drawing Sheets

COMMUNICATING PURCHASE REQUESTS TO OFFLINE DEVICES

BACKGROUND

Mobile payments are steadily becoming more ubiquitous as part of global commerce. Users of mobile devices may use payment services to pay merchants as well as to engage in peer-to-peer payment. In certain instances, a user of a first device may request that another user of a second device purchase one or more items from a merchant on the user's behalf. Such communication may be performed between the first user device and the second user device. However, in some cases, the second user device may be deactivated, offline, and/or otherwise be unable to receive the request from the first user device.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Systems and methods are provided for communicating purchase requests to offline devices. As used herein, "offline" may refer to a state in which a device is deactivated, logged out, and/or otherwise unable to receive certain messages. According to a particular embodiment, a first user and a second user may have a corresponding first user device and a second user devices, respectively. Further, the first user may maintain an account with a payment provider, and the first user device may store a payment provider application that is provided and maintained by the payment provider. The second user device may attempt to communicate a message to the first user device, such as via a social media post, an instant message, a text message, and/or any other type of messaging application. Further, the message may correspond to a request for the first user to purchase an item offered by a merchant at a particular merchant location on behalf of the second user.

For example, the first user may post a social media message, via the first user device, indicating that the first user is about to head to a particular merchant location, such as a grocery store to buy groceries. The second user may view, via the second user device, the social media message posted by the first user. The second user may respond to the social media message by transmitting a message to the first user indicating that the second user wishes the first user to buy a particular item at the grocery store. For example, the response may include a purchase request for the first user to buy the item for the second user, and the purchase request may include, but is not limited to, the second user's identification information (e.g., the second user's name and/or location), an item identifier associated with the item, a merchant identifier associated with the merchant, and/or merchant location information corresponding to a particular store of the merchant.

However, the first user device may be offline and/or deactivated when the second user's response to the social media message of the first user is transmitted. For instance, the first user device may have been deactivated due to low battery power, deactivated manually by the first user, and/or deactivated by various other means. As a result, the first user may be unable to view the social media message via the first user device.

As previously discussed, the first user device may store the payment provider application that is provided and maintained by the payment provider. According to certain embodiments, the social media message may be posted by the first user via the payment provider application, and the response to the social media message by the second user may be generated and/or transmitted via another instance of the payment provider application stored on the second user device. In other embodiments, the posted social media message and the response may be generated by third party social media applications and/or messaging applications stored on the first user device and the second user device, respectively. In such cases, a payment provider server of the payment provider may be configured to interface and/or communicate with the third-party applications. Regardless, the payment provider server may able to access the social media message posted by the first user and the response transmitted by the second user.

Furthermore, the payment provider server may determine that the first user device is offline and/or deactivated when the response to the social media message is transmitted by the second user (e.g., the second user device) using various methods. For example, the payment provider application on the first user device may transmit an indication that the first user device is being deactivated, such as due to lower battery power or another reason. In some implementations, such an indication may also be transmitted in response to the first user logging out of the payment provider application stored on the first user device. In other implementations, the payment provider server may attempt to forward the second user's response to the social media message to the first user device. After a predetermined number of attempts to transmit the second user's response without receiving an acknowledgement from the first user device that the first user device has received the response, the payment provider server may determine that the first user device is offline.

In response to determining that the first user device is offline or deactivated, the payment provider server may generate a payment token corresponding to the purchase request. The payment token may include various information including, but not limited to, identification information of the second user, account information associated with the account of the first user, identification information of the first user, the item identifier associated with the item, the merchant identifier, and/or the merchant location information. The payment provider server may further associated the payment token with the account of the first user and store the payment token (and/or the association between the payment token and the account of the first user).

Subsequently, the payment provider server may receive a checkout request from a POS device. The checkout request may indicate that the first user is attempting to purchase one or more other items from the merchant. Additionally, the checkout request may be transmitted by the POS device in response to the first user inputting authentication information at the POS device to access the account of the first user with the payment provider. In certain implementations, the first user may provide the authentication information by inputting biometric information into the POS device. Biometric information may include, but is not limited, fingerprint data, voice data, iris scanning data, facial recognition data, and/or like. As such, the POS device may include any number of appropriate sensors in order to capture such biometric information from customers (e.g., the first user). Other types of authentication information are also possible, such as username/password login information, personal identification numbers, financial account information (e.g., extracted from a debit/credit card), and/or the like.

The authentication information may be transmitted to the payment provider server along with the checkout request. In certain implementations, the authentication information may be included in the checkout request. In addition, the checkout request may include a POS identifier associated with the POS device and/or other POS information, such as location information associated with the POS device, a merchant identifier associated with the POS device, and/or the like. In other cases, the payment provider server may determine the other POS information based on the POS identifier (e.g., the payment provider server may store associations between the POS identifier and the other POS information in a database).

Using the authentication information, the payment provider server may access account information associated with the account of the user. Based on the account information, the payment provider server may identify the association between the account and the payment token previously stored by payment provider server. As such, the payment provider server may access token information included in the payment token to determine whether the payment token should be applied to the checkout request. For example, the payment provider may identify, based on the account information, a merchant location corresponding to the purchase request included in second user's response (to the social media message posted by the first user). Further, the payment provider server may compare the merchant location with location information of the POS device to determine whether the POS device is located at the merchant location.

In response to determining that that the POS device is located at the merchant location, the payment provider server may transmit instructions to the POS device that cause the POS device to display additional checkout information. The additional checkout information may indicate the purchase request by the second user for the first user to purchase the particular item from the merchant on the second user's behalf. The POS device may further display an option for the first user to accept and/or reject the purchase request. If the POS device receives an input to accept the purchase request, the particular item may be added to the checkout of the first user.

Figure 1:
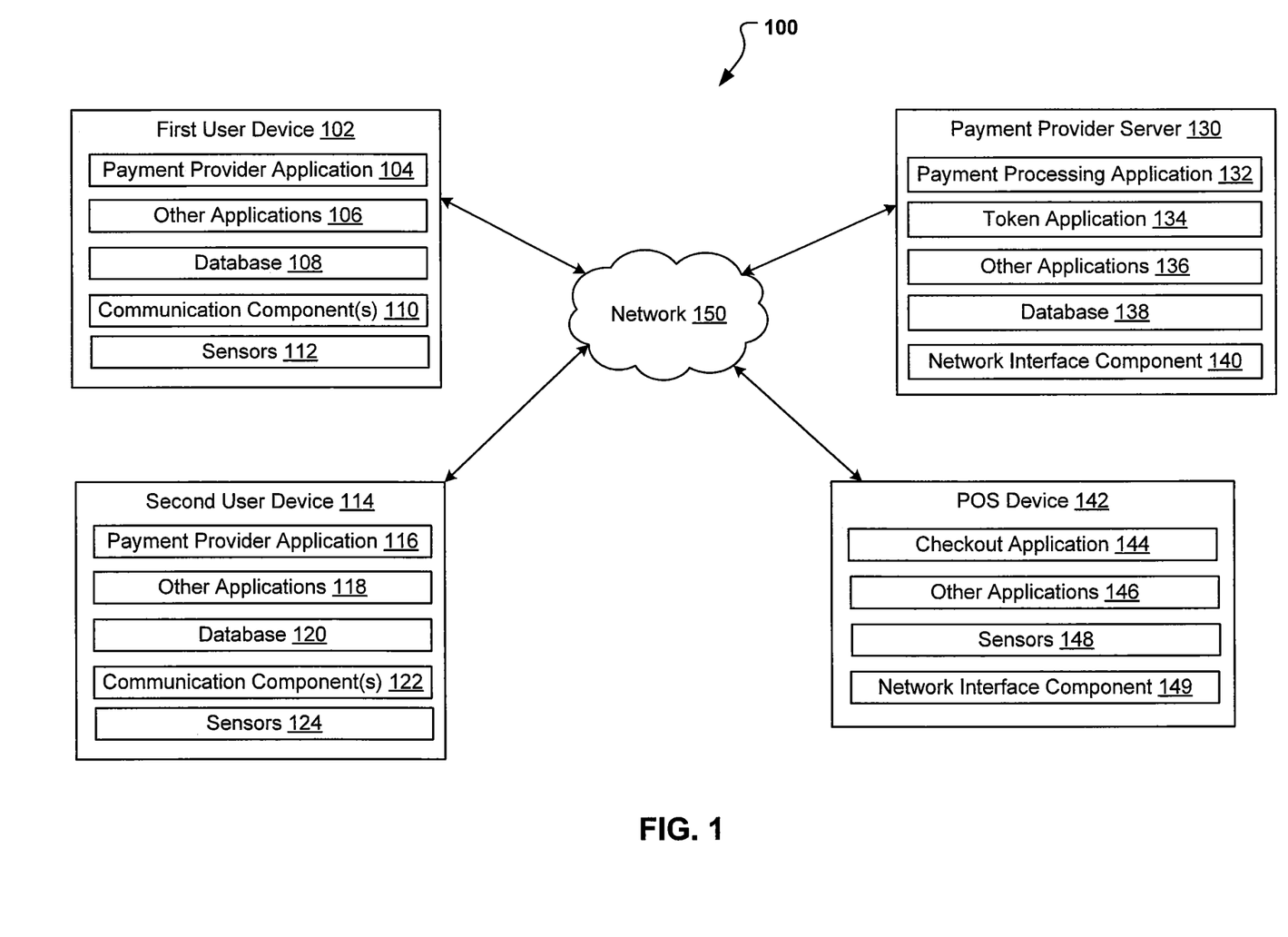
FIG. 1 is a block diagram of a networked system suitable for implementing the processes described herein for communicating purchase requests to offline devices.

FIG. 1 is a block diagram of a networked system 100 for implementing the processes described herein, according to an embodiment. As shown, system 100 may include or implement a plurality of devices, computers, servers, and/or software components that operate to perform various methodologies in accordance with the described embodiments. Example devices, computers, and servers may include mobile devices, wearable devices, stand-alone devices, desktop computers, laptop computers, and enterprise-class servers, executing an operating system (OS) such as a MICROSOFT® OS, a UNIX® OS, a LINUX® OS, or another suitable device and/or server based OS. It will be appreciated that the devices, computers, and/or servers illustrated in FIG. 1 may be deployed differently and that the operations performed and/or the services provided by such devices, computers, and/or servers may be combined or separated for a given embodiment and may be performed by a greater number or fewer number of devices, computers, and/or servers. Furthermore, one or more of the devices, computers, and/or servers may be operated and/or maintained by the same or different entities.

System 100 includes a first user device 102 configured to interface with a first user, a second user device 114, a payment provider server 130, and/or a POS device 142, which may be in communication with each other over a network 150. The first user device 102, the second user device 114, the payment provider server 130, and the POS device 142 may each include one or more processors, memories, and other appropriate components for executing computer-executable instructions such as program code and/or data. The computer-executable instructions may be stored on one or more computer readable mediums or computer readable devices to implement the various applications, data, and steps described herein. For example, such instructions may be stored in one or more computer readable media such as memories or data storage devices internal and/or external to various components of system 100, and/or accessible over network 150.

The first user device 102 may be implemented as a communication device that may utilize appropriate hardware and software configured for wired and/or wireless communication with the second user device 114, the payment provider server 130 and/or the POS device 142. In certain implementations, the first user device 102 may be a mobile phone, tablet, electronic wearable, laptop computer, desktop computer, and/or any other type of computing device usable by the first user. The first user device 102 may be configured to accept various forms of payment (such as via the payment provider application 104), including, but not limited to credit card payments, debit card payments, loyalty card payments, gift card payments, store card payments, and/or payment made by accessing a digital wallet.

The first user device 102 may include a payment provider application 104, other applications 106, a database 108, communication components 110, and sensors 112. The payment provider application 104 and other applications 106 may correspond to executable processes, procedures, and/or applications with associated hardware. In other embodiments, first user device 102 may include additional or different components having specialized hardware and/or software to perform operations associated with the payment provider application 104 and/or the other applications 106.

The payment provider application 104 may be provided and maintained by a payment provider associated with the payment provider server 130. In certain embodiments, the payment provider application 104 may provide an interface for the first user of the first user device 102 to effect digital payments using an account that the first user maintains with the payment provider. According to a particular embodiment, the payment provider application 104 may also facilitate message communication (e.g., instant messages, text message, and/or other types of messages) with other users that maintain accounts with the payment provider. In other embodiments, the payment provider application 104 may enable the first user to post one or more messages on a social media platform, which may be provided by the payment provider or a third-party service provider.

The first user device 102 may execute the other applications 106 to perform various other tasks and/or operations corresponding to the first user device 102. For example, the other applications 106 may include security applications for implementing client-side security features, programmatic client applications for interfacing with appropriate application programming interfaces (APIs) over network 150, or other types of applications. The other applications 106 may also include additional communication applications, such as email, texting, voice, and instant messaging (IM) applications that enable a user to send and receive emails, calls, texts, and other notifications through the network 150. In various embodiments, the other applications 106 may include location detection applications, such as a mapping, compass, and/or global positioning system (GPS) applications, which may be used to determine a location of the first user device 102. The other applications 106 may include social networking applications. Additionally, the other applications 106 may include device interfaces and other display modules that may receive input and/or output information. For example, the other applications 106 may include a graphical (GUI) configured to provide an interface to the user.

In some embodiments, the other applications 106 may include a social media application that enables the first user to interface with a social media platform provided by a third-party service provider. Further, the payment provider may be integrated with the social media platform (and/or otherwise be in communication with the social media platform). For example, the payment provider server 130 may be in communication with one or more servers or devices of the social media platform.

The first user device 102 may further include a database 108, which may be stored in a memory and/or other storage device of the first user device 102. The database 108 may include, for example, identifiers (IDs) such as operating system registry entries, cookies associated with the digital wallet application 104 and/or other applications 106, IDs associated with hardware of the communication component 110, IDs used for payment/user/device authentication or identification, and/or other appropriate IDs. The database 108 may also include information corresponding to one or purchase transactions of customers who have purchased goods or services from one or more merchants (e.g., such as a merchant that maintains the POS device 142), browsing histories of the customers, or other types of customer information. In certain embodiments, the first user device 102 may also include information corresponding to payment tokens, such as payment tokens generated by the payment provider server 130. Further, the database 108 may store login credentials (e.g., such as to login to the account with the payment provider and/or other accounts with other service providers), identification information, biometric information, and/or authentication information.

The first user device 102 may also include at least one communication component 110 configured to communicate with various other devices such as the second user device 114 and/or the payment provider server 130. In various embodiments, communication component 110 may include a Digital Subscriber Line (DSL) modem, a Public Switched Telephone Network (PTSN) modem, an Ethernet device, a broadband device, a satellite device and/or various other types of wired and/or wireless network communication devices including microwave, radio frequency, infrared, Bluetooth, Bluetooth low-energy, near field communication (NFC) devices, and/or the like.

The first user device 102 may also include one or more hardware sensors 112 to determine user inputs from the user, motion of the first user device 102, biometric information associated with the user, and/or various environmental data associated with the first user device 102. The sensors 112 may include, but are not limited to, gyroscopes, cameras, microphones, accelerometers, barometers, thermometers, compasses, magnetometers, light detectors, proximity sensors, fingerprint sensors, pedometers, and heart rate monitors.

The second user device 114 may be implemented as a communication device that may utilize appropriate hardware and software configured for wired and/or wireless communication with the first user device 102, the payment provider server 130 and/or the POS device 142. In certain implementations, the second user device 114 may be a mobile phone, tablet, electronic wearable, laptop computer, desktop computer, and/or any other type of computing device usable by a second user different than the first user. The second user device 114 may be configured to accept various forms of payment (such as via the payment provider application 116), including, but not limited to credit card payments, debit card payments, loyalty card payments, gift card payments, store card payments, and/or payment made by accessing a digital wallet.

The second user device 114 may include a second instance of the payment provider application 116, other applications 118, a database 120, communication components 122, and sensors 124. The payment provider application 116 and other applications 118 may correspond to executable processes, procedures, and/or applications with associated hardware. In other embodiments, second user device 114 may include additional or different components having specialized hardware and/or software to perform operations associated with the payment provider application 116 and/or the other applications 118.

The payment provider application 116 may be provided and maintained by the payment provider associated with the payment provider server 130. In certain embodiments, the payment provider application 116 may provide an interface for the second user of the second user device 114 to effect digital payments using an account that the second user maintains with the payment provider. According to a particular embodiment, the payment provider application 116 may also facilitate message communication (e.g., instant messages, text message, and/or other types of messages) with other users that maintain accounts with the payment provider (e.g., such as the first user). In other embodiments, the payment provider application 116 may enable the second user to post and/or respond to one or more messages on a social media platform, which may be provided by the payment provider or a third-party service provider.

The second user device 114 may execute the other applications 118 to perform various other tasks and/or operations corresponding to the second user device 114. For example, the other applications 118 may include security applications for implementing client-side security features, programmatic client applications for interfacing with appropriate application programming interfaces (APIs) over network 150, or other types of applications. The other applications 118 may also include additional communication applications, such as email, texting, voice, and instant messaging (IM) applications that enable a user to send and receive emails, calls, texts, and other notifications through the network 150. In various embodiments, the other applications 118 may include location detection applications, such as a mapping, compass, and/or global positioning system (GPS) applications, which may be used to determine a location of the second user device 114. The other applications 118 may include social networking applications. Additionally, the other applications 118 may include device interfaces and other display modules that may receive input and/or output information. For example, the other applications 118 may include a graphical (GUI) configured to provide an interface to the user. The other applications 118 may also include a social media application that enables the second user to interface with a social media platform provided by a third-party service provider. Further, the payment provider may be integrated with the social media platform (and/or otherwise be in communication with the social media platform), such as via the payment provider server 130.

According to a particular embodiment, the second user may attempt to transmit a purchase request, via the second user device 114, that requests that the first user to purchase an item (on behalf of the second user) being sold by a merchant at a particular merchant location. It will be appreciated that while references will be made to the purchase request being a request for the item, the purchase request could also be for multiple items.

The purchase request may be transmitted via the payment provider application 116 or a third-party messaging application. In certain cases, the purchase request may be a response by the second user to a message transmitted by the first user. For example, the message transmitted by the first user could be an instant message sent directly to the second user, or the message could be a social media message posted by the first user. For instance, the first user may transmit an instant message to the second user indicating that the first user is about to head to a merchant location, such as a grocery store. In other instances, the first user may post a social media message to a social media platform indicating his/her intention to go to the grocery store. In such instances, the social media platform may be integrated or in communication with the payment provider such that the social media platform may provide a user interface that allows the second user to make a purchase request using messaging services or other services of the payment provider. It will be appreciated, however, that the purchase request may be unprompted and that second user may initiate the purchase request unrelated to any messages transmitted or posted by the first user.

Furthermore, the purchase request of the second user may include identification information associated with the second user (e.g., such name, address, and/or location information associated with the second user device 114), an item identifier associated with the item, identification information associated with the first user (e.g., name, address, account number of the account the first user maintains with the payment provider), and merchant location information associated with the particular merchant location or store. As discussed in more detail below, though the first user device 102 may be the intend recipient of the purchase request, the payment provider server 130 may be receive the purchase request before the purchase request is forwarded to the first user device 102.

The second user device 114 may further include a database 120, which may be stored in a memory and/or other storage device of the second user device 114. The database 120 may include, for example, identifiers (IDs) such as operating system registry entries, cookies associated with the digital wallet application 104 and/or other applications 118, IDs associated with hardware of the communication component 122, IDs used for payment/user/device authentication or identification, and/or other appropriate IDs. The database 120 may also include information corresponding to one or purchase transactions of customers who have purchased goods or services from one or more merchants (e.g., such as a merchant that maintains the POS device 142), browsing histories of the customers, or other types of customer information. In certain embodiments, the second user device 114 may also include information corresponding to payment tokens, such as payment tokens generated by the payment provider server 130. Further, the database 120 may store login credentials (e.g., such as to login to an account of the second user with the payment provider and/or other accounts with other service providers), identification information, biometric information, and/or authentication information.

The second user device 114 may also include at least one communication component 122 configured to communicate with various other devices such as the second user device 114 and/or the payment provider server 130. In various embodiments, communication component 122 may include a Digital Subscriber Line (DSL) modem, a Public Switched Telephone Network (PTSN) modem, an Ethernet device, a broadband device, a satellite device and/or various other types of wired and/or wireless network communication devices including microwave, radio frequency, infrared, Bluetooth, Bluetooth low-energy, near field communication (NFC) devices, and/or the like.

The second user device 114 may also include one or more hardware sensors 124 to determine user inputs from the user, motion of the second user device 114, biometric information associated with the second user, and/or various environmental data associated with the second user device 114. The sensors 124 may include, but are not limited to, gyroscopes, cameras, microphones, accelerometers, barometers, thermometers, compasses, magnetometers, light detectors, proximity sensors, fingerprint sensors, pedometers, and heart rate monitors.

The payment provider server 130 may be maintained, for example, by the payment provider, which may provide payment processing services for the merchant and/or users of the payment application 106. In one example, the payment provider server 130 may be provided by PAYPAL, Inc. of San Jose, Calif. USA. However, in other embodiments, the payment provider server 130 may be maintained by or include a financial service provider, social networking service, email or messaging service, media sharing service, and/or other service provider, which may provide payment processing services.

The payment provider server 130 includes a payment processing application 132. The payment processing application may be configured to facilitate digital payments for users of the payment provider. According to a particular embodiment, the payment processing application 132 may receive the purchase request initiated by the second user via the second user device 114. The payment processing application may also determine that the purchase request is intended for the first user and/or first user device 102.

Furthermore, the payment processing application 132 may determine that the first user device is offline and/or deactivated. To this end, various implementations are possible that may enable the payment processing application 132 to make such a determination. In some implementations, the first user device 102 may be configured to transmit (e.g., via the payment provider application 104) an indication to the payment provider server 130 that deactivation of the first user device 102 is imminent or that the first user device is going offline, such as due to low battery power, manual deactivation by a user, and/or various other reasons. In other implementations, the payment processing application 132 may attempt to notify the first user device 102 of the purchase request from the second user. After the payment processing application 132 has attempted to notify the first user device 102 a predetermined number of times without receiving an acknowledgement of the attempts from the first user device 102, the payment processing application 132 may determine that the first user device 102 has been deactivated or is offline.

In response to determining that the first user device 102 is deactivated or offline, the payment processing application 132 may direct the token application 134 to generate a payment token corresponding to the purchase request of the second user. The payment token may include token information that indicates various aspects of the purchase request, such as the identification information associated with the second user, the item identifier associated with the item, the identification information associated with the first user, and the merchant location information associated with the particular merchant location or store. The token information may further include information corresponding to a financial instrument of the first user without actually including the particular account number of the financial instrument. In certain implementations, the payment token may in effect pre-authorize the first user's purchase of the item using the financial instrument. Furthermore, the token application 134 may associate the payment token with the account of the first user with the payment provider and store the association in the database 138. In certain embodiments, the payment token may be associated with a predetermined time limit, after which the payment token may be discarded, deleted, and/or otherwise invalidated.

Subsequent to storing the association between the payment token and the account of the first user with the payment provider, the payment processing application 132 may receive a checkout request, such as from the POS device 142. The checkout request may correspond to a first user attempting to buy one or more items sold by the merchant at the merchant location. The checkout request may include checkout information, such as a user identifier corresponding to the first user, respective item identifiers corresponding to the one or more items being checked out, and device location information corresponding to the POS device 142. For example, the first user may interact with the POS device 142 and provide authentication information to the POS device 142 (e.g., biometric information, username/password login information to the account with the payment provider, credit/debit card or other financial instrument that is provided by the payment provider or otherwise associated with the payment provider, etc.). The checkout request may be transmitted to the payment provider server 130 along with the authentication information.

Based on the authentication information and/or the checkout information, the payment processing application 132 may identify the account of the first user. For instance, the authentication information may be compared with previously stored authentication information corresponding to the first user, and the previously stored authentication information may be associated with the account of the first user. As such, the payment processing application 132 may identify the account of the first user based on the authentication information matching the previously stored authentication information. Furthermore, the payment processing application 132 may determine that the account is also associated with the payment token, based on the association that was previously stored by the token application 134.

Responsive to this determination, the payment processing application 132 may compare the token information included in the payment token with the checkout information in order to ascertain whether the payment token should be applied to the checkout request. For instance, the payment processing application 132 may compare the merchant location information included in the token information with device location information included in the checkout information. Based on the comparison, if the payment processing application 132 determines that the POS device 142 is located at the merchant location, or within a predetermined distance of the merchant location, the payment processing application 132 may determine that payment token should be applied to the checkout request. In response to determining that the payment token should be applied to the checkout request, the payment processing application 132 may transmit the payment token and/or information associated with the payment token to the POS device 142.

The payment provider server 130 may execute the other applications 136 to perform various other tasks and/or operations corresponding to the payment provider server 130. For example, the other applications 136 may include security applications for implementing server-side security features, programmatic client applications for interfacing with appropriate application programming interfaces (APIs) over network 150, or other types of applications. The other applications 136 may also include additional communication applications, such as email, texting, voice, and instant messaging (IM) applications that enable a user to send and receive emails, calls, texts, and other notifications through the network 150. In various embodiments, the other applications 136 may include location detection applications, such as a mapping, compass, and/or global positioning system (GPS) applications. The other applications may 136 include social networking applications. Additionally, the other applications 136 may include device interfaces and other display modules that may receive input and/or output information. For example, the other applications 136 may include a GUI configured to provide an interface to a user.

The payment provider server 130 may further include a database 138, which may be stored in a memory and/or other storage device of the payment provider server 130. The database 138 may include, for example, IDs such as operating system registry entries, cookies associated with the payment processing application 132, biometric information, IDs associated with hardware of the network interface component 140, IDs used for payment/user/device authentication or identification, and/or other appropriate IDs. According to a particular embodiment, the database 138 may also store a merchant identifier associated with the merchant, a location identifier associated with the merchant location, and/or a POS identifier associated with the POS device 142. As previous discussed, the database 138 may also store an association between the payment token and the account of the first user with the payment provider.

In various embodiments, the payment provider server 130 also includes at least one network interface component 140 that is configured to communicate with the first user device 102, the second user device 114, and/or the POS device 142 via the network 150. The network interface component 140 may comprise a DSL modem, an Ethernet device, a broadband device, a satellite device and/or various other types of wired and/or wireless network communication devices including microwave, RF, and IR communication devices.

The POS device 142 may be maintained, for example, by the merchant and may be in communication with the payment provider server 130. The POS device 142 includes a checkout application 144, which may be executed by the POS device 142 to facilitate checkout with customers of the merchant at a merchant location.

As previously discussed, the checkout application 144 may enable to the first user to checkout with one or more items the first user wishes to purchase from the merchant at the merchant location. The first user may provide authentication information to the POS device 142, such as biometric information, username/password login information, credit/debit cards or other financial instruments that may be provided by the payment provider, and/or various other possible authentication mans. Further, the POS device 142 may include one or more sensors 148, such as biometric sensors to receive biometric information from the first user.

The checkout application may 144 generate a checkout request, which may include the checkout information, as previously discussed. The checkout application 144 may transmit the checkout request to the payment provider server 130. Further, as previously discussed, the payment processing application 132 may determine that the payment token should be applied to the checkout request and transmit the payment token and/or information associated with the payment token back to the POS device 142. The payment token may cause the checkout application 144 to display an additional request for the user to add the item that was included in the initial purchase request (by the second user) to the first user's checkout. To this end, the checkout application 144 may display user interface options for the first user to accept or reject the additional request.

The POS device 142 may execute the other applications 146 to perform various other tasks and/or operations corresponding to the payment provider server and/or the first user device 102. For example, the other applications 146 may include security applications for implementing server-side security features, programmatic client applications for interfacing with appropriate APIs over network 150, or other types of applications. The other applications 146 may also include additional communication applications, such as email, texting, voice, and instant messaging (IM) applications that enable a user to send and receive emails, calls, texts, and other notifications through the network 150. In various embodiments, the other applications 146 may include location detection applications, such as a mapping, compass, and/or global positioning system (GPS) applications, which may be used to determine a location of the POS device 142. The other applications may 146 include social networking applications. Additionally, the other applications 146 may include device interfaces and other display modules that may receive input and/or output information. For example, the other applications 146 may include a GUI configured to provide an interface to the user.

In various embodiments, the POS device 142 also includes at least one network interface component 149 that is configured to communicate with the first user device 102 and/or the payment provider server 130 via the network 150. The network interface component 149 may comprise a DSL modem, a PTSN modem, a payment provider server, an Ethernet device, a broadband device, a satellite device and/or various other types of wired and/or wireless network communication devices including microwave, RF, and IR communication devices.

The network 150 may be implemented as a single network or a combination of multiple networks. For example, in various embodiments, the network 150 may include the Internet or one or more intranets, landline networks, wireless networks, and/or other appropriate types of networks. Thus, the network 150 may correspond to small scale communication networks, such as a private or local area network, or a larger scale network, such as a wide area network or the Internet, accessible by the various components of system 100.

Figure 2:
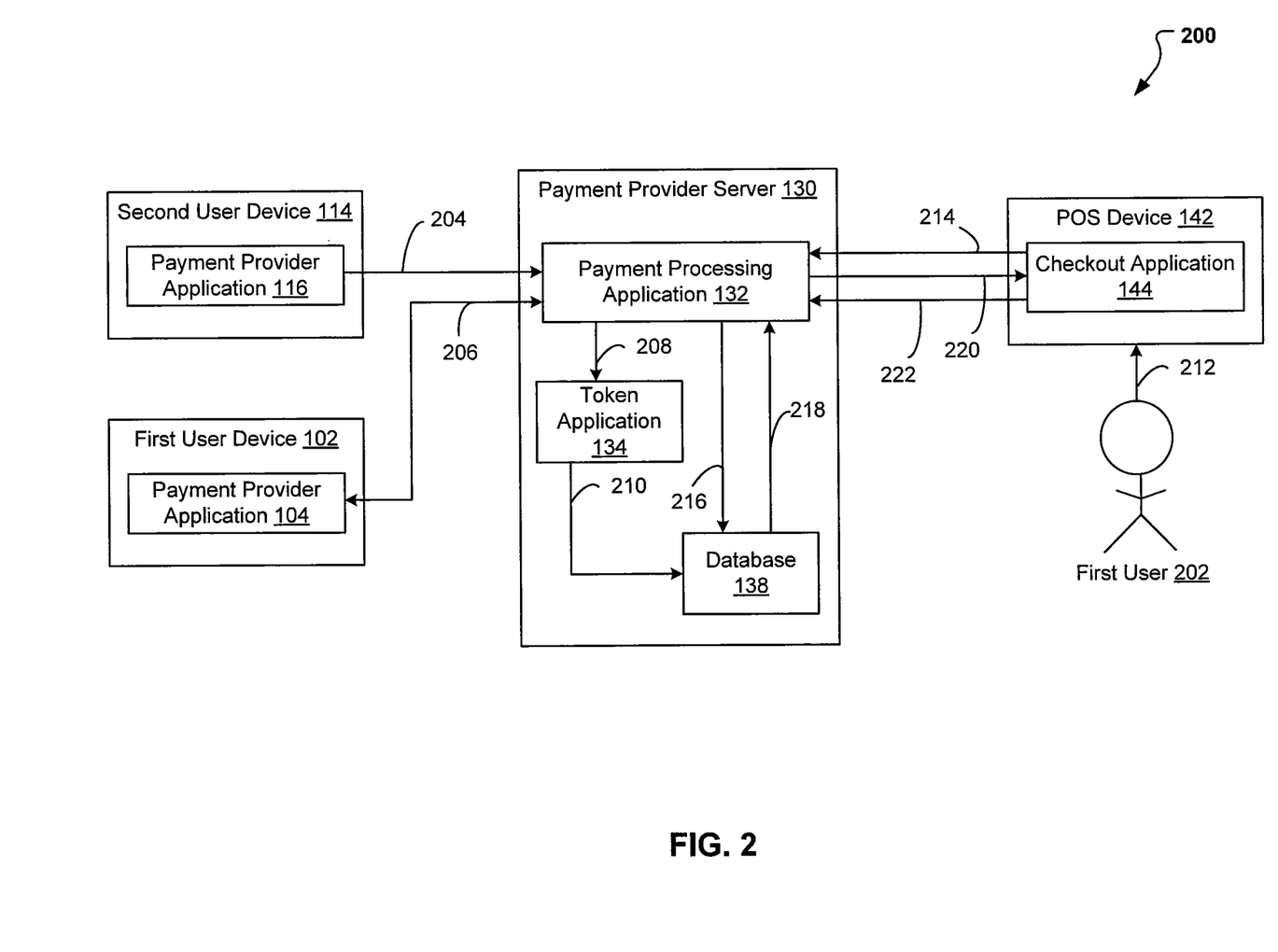
FIG. 2 is an is an example data flow diagram for communicating purchase requests to offline devices, according to an embodiment.

FIG. 2 illustrates a data flow 200 for communicating purchase requests to offline devices. At step 204, the payment processing application 132 of the payment provider server 130 may receive a purchase request from the second user device 114. Although FIG. 2 illustrates the purchase request as being transmitted from the payment provider application 116 of the second user device 114, the purchase request may also be transmitted using any other type of application of the second user device 114 that may be able to interface with the payment provider and/or payment provider server 130. The purchase request may correspond to a request by the second user of the second user device 114 for a first user of the first user device 102 to purchase, on the second user's behalf, an item from a merchant at a merchant location.

At step 206, the payment processing application 132 may determine that the first user device 102 is offline. As previously discussed, the first user device 102 may transmit an indication to the payment provider server 130 (such as via the payment provider application 104) that the first user device 102 is being deactivated or going offline. As another example, the payment processing application 132 may determine that the first user device 102 is offline and/or otherwise unable to receive messages after a predetermined number of attempts by the payment processing application 132 to transmit the purchase request to the first user device 102 without receiving an acknowledgement from the first user device 102.

In response to determining that the first user device 102 is offline, the payment processing application 132 may at step 208 direct the token application 134 to generate the payment token. At step 210, the token application 134 may store an association between the payment token and an account of the first user with payment provider in the database 138.

Subsequently, at step 212, the first user 202 may interact with the POS device 142 to checkout one or more items at a merchant location of the merchant. The checkout application 144 of the POS device may generate a checkout request corresponding to the first user and the one or more items to be purchased. Furthermore, the user 202 may select a payment option provided by the payment provider to pay for the one or more items to be purchased. To this end, the first user 202 may input authentication information to access the account of the first user 202 with the payment provider. As such, at step 214, the checkout application 144 may transmit the checkout request and the authentication information to the payment provider server 130.

Based on the authentication information included in the checkout request, the payment processing application 132 may identify the account of the first user with the payment provider. The payment processing application 132 may further identify the association between the account and the payment token previously stored by the token application 134. For example, at step 216, the payment processing application 132 may access the database 138 using an account identifier associated with the account of the first user. At step 218, the payment processing application 132 may be able to retrieve the payment token from the database 138.

At step 220, the payment processing application 132 may transmit the payment token and/or information included in the payment token to the POS device 142, which may cause the checkout application 144 to display an indication of the purchase request from the second user. The checkout application 144 may generate a user interface that displays respective options for the first user 202 to accept or decline the item requested by the second user's purchase request. As such, the first user 202 may input a response to the displayed purchase request, and at step 222, the first user's response may be transmitted by the checkout application 144 to the payment processing application 132. The payment processing application 132 may process the checkout request accordingly, depending on the first user's response, and the appropriate payment amount may be transferred from an account of the first user (e.g., the account of the first user with the payment provider or any other financial account of the first user) to an account of the merchant.

According to a particular embodiment, in response to initial checkout request (e.g., at step 214), the payment processing application 132 may perform a risk analysis using the checkout information. The risk analysis may determine a risk level indicating a likelihood that checkout request is a fraudulent transaction. If the risk level satisfies a risk threshold (e.g., the checkout request is not deemed to be fraudulent), only then may the payment processing application 132 proceed to determining whether a payment token is associated with the account of the first user 202 and whether the payment token should be applied to the checkout request.

In cases where: 1.) the risk level does indeed satisfy the risk threshold, 2.) the payment token or the information associated with the payment token is transmitted to the POS device 142, and 3.) the first user 202 accepts the addition of the item included in the second user's purchase request to the checkout, the payment provider server 142 may be able to process payment of the first user's checkout request with the addition of the additionally requested item of the second user without having to once again perform the risk analysis process. In particular, the payment token may indicate that the additional item from the second user's purchase request is pre-authorized for purchase pending the first user's 202 authorization to add the additional item.

Figure 3:
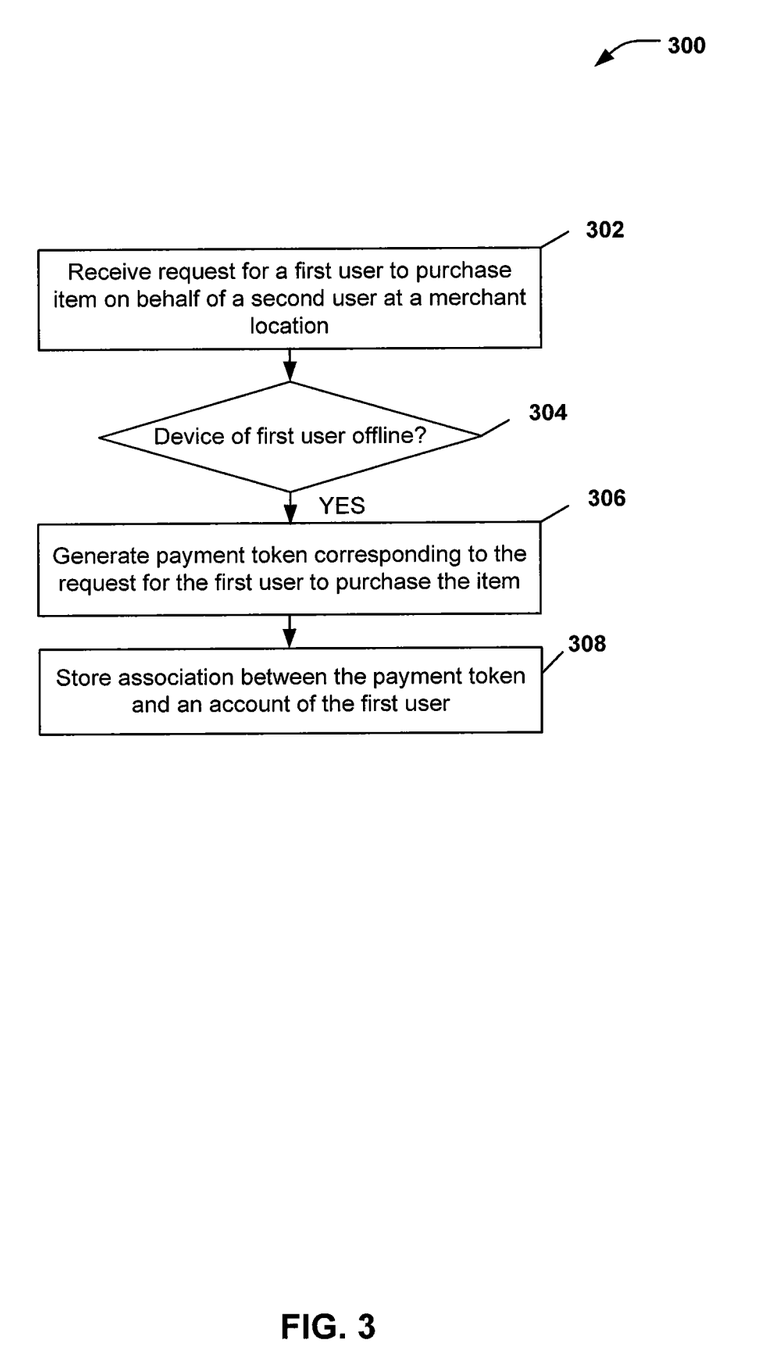
FIG. 3 is an example flow diagram for storing a purchase request, according to another embodiment.

FIG. 3 illustrates a flow diagram of a method 300 for storing a purchase request. Note that one or more steps, processes, and methods described herein may be omitted, performed in a different sequence, or combined as desired or appropriate.

The method 300 may being in step 302, wherein a payment provider server, such as payment provider server 130, may receive a purchase request for a first user to purchase an item on behalf of a second user at merchant location. At step 304, the payment provider server 130 (e.g., the payment processing application 132) may determine if a device of the first user (e.g., the first user device 102) is offline. If the first user device 102 is not offline, the payment processing application 132 may forward the purchase request to a device of the second user (e.g., the second user device 114).

At step 306, in response to determining that the first user device 102 is offline, the payment provider server 130 (e.g., the token application 134) may generate a payment token corresponding to the purchase request. Further at step 308, the token application 134 may store an association between the payment token and an account of the first user with the payment provider.

Figure 4:
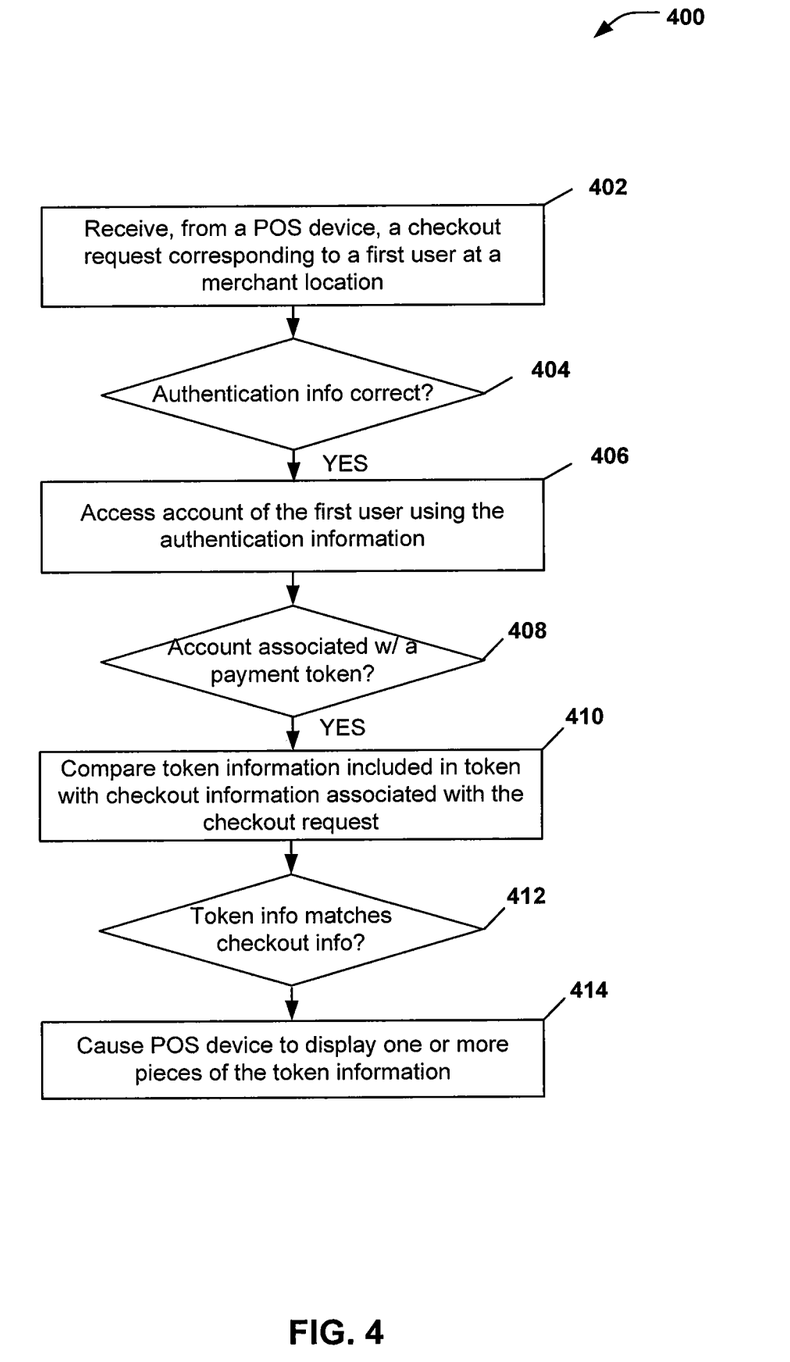
FIG. 4 is an example flow diagram for communicating purchase requests to offline devices, according to an embodiment.

FIG. 4 illustrates a flow diagram of a method 400 for communicating purchase requests to offline devices. Note that one or more steps, processes, and methods described herein may be omitted, performed in a different sequence, or combined as desired or appropriate.

The method 400 may begin in step 402, where a payment provider server, such as payment provider server 130 may receive, from a POS device (e.g., POS device 142), a checkout request corresponding to a first user at a merchant location. According to a particular embodiment, the checkout request may include authentication information associated with the first user.

At step 404, the payment provider server 130 may determine whether the authentication information matches previously stored authentication information for the first user. If so, the method 400 may proceed to step 406, where the payment provider server 130 (e.g., the payment processing application 132) may access an account of the first user based on the authentication information. For example, the previously stored authentication information may be associated with the account of the first user with the payment provider.

At step 408, the payment processing application may determine whether the account of the first user is associated with a payment token, such as the payment token stored by the token application 134 described in FIG. 3. If so, the method 400 may proceed to step 410, where the payment processing application 132 may compare token information included in the payment token with checkout information included in the checkout request.

At step 412, the payment processing application 132 may determine whether appropriate portions of the token information matches corresponding portions of the checkout information. For example, as previously discussed, the payment processing application 132 may determine, based on the comparison, whether the POS device 142 is located at the same merchant location that was indicated by the purchase request (that was initiated/transmitted by the second user device 114 and described in FIG. 3). If the appropriate portions of the token information and checkout information match, the method 400 may proceed to step 414. At step 414, the payment processing application may cause the POS device 142 to display one or more pieces of the token information (e.g., the purchase request of the second user).

Other embodiments of the present disclosure may include several variations on the ideas that have been discussed. For example, according certain embodiments, a user such as the first user of the first user device 102 may browse a merchant site using the first user device 102 via a web browser or a merchant application associated with the merchant. The first user may add one or more items sold by the merchant to an electronic shopping cart. Furthermore, the merchant site may also be communication with the payment provider server 130 (e.g., to facilitate payments using the payment provider). However, before the first user is able to purchase the one or more items in the shopping cart, the first user device 102 may be deactivated and/or otherwise become offline.

Further, the first user device 102 may transmit deactivation information to the payment provider server 130 indicating that the first user device 102 is being deactivated or entering an offline mode. Additionally, along with the deactivation information, the first user device 102 may transmit, to the payment provider server 130, shopping cart information that includes the contents of the first user's shopping cart on the merchant site. As such, the token application 134 may generate a payment token that includes the shopping cart information and stores an association between the payment token and an account of the first user with payment provider.

Subsequently, the payment provider server 130 may receive (e.g., via the payment processing application 132) a checkout request from a POS device, such as POS device 142. The POS device 142 may correspond to a second merchant that is different from the merchant with whom the first user maintains the shopping cart (although in other embodiments, the second merchant may be the same as the first merchant). To this end, the second merchant (e.g., servers or other devices of the second merchant) may also be in communication with the payment provider server 130.

The checkout request may include authentication information, and the payment processing application 132 may determine that the authentication matches previously stored authentication information corresponding to the first user. Based on the authentication information matching the stored authentication information, the payment processing application 132 may access the account of the first user. Further the payment processing application 132 may identify the payment token associated with the account, thereby also identifying the shopping cart information.

Accordingly, the payment processing application 132 may determine a subset of the one or more items indicated by the shopping cart information that are also sold by the second merchant at the location of the POS device 142. Upon determining the subset, the payment processing application 132 transmit instructions to the POS device 142 that cause the POS device 142 to display a request to add the subset of the one or more items to the checkout. The POS device 142 may enable the user interacting with the POS device 142 (e.g., the first user) at the location of the second merchant to accept or decline adding each item in the subset to the checkout.

Figure 5:
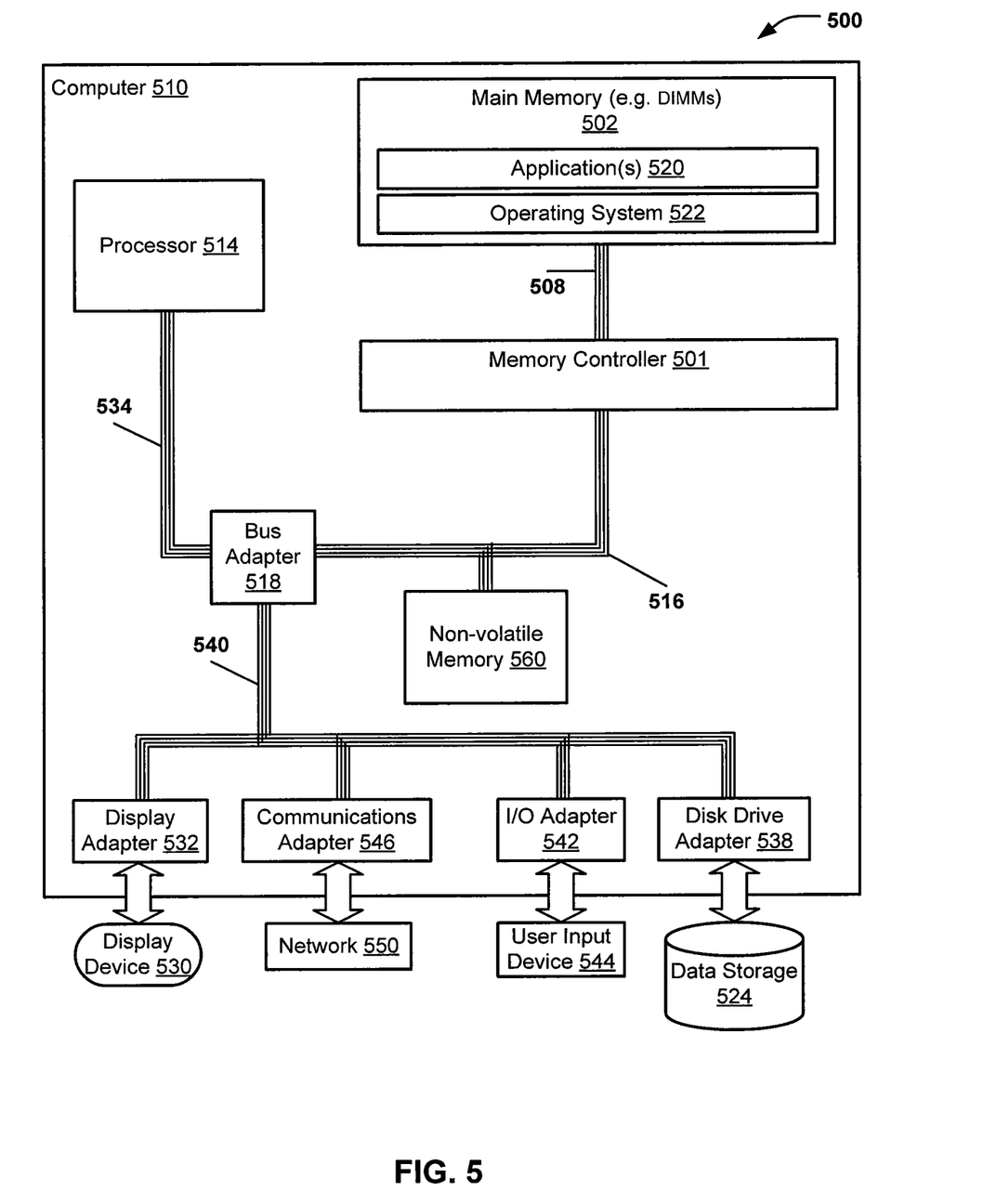
FIG. 5 is a block diagram of a computer system suitable for implementing one or more components in FIG. 1-4, according to an embodiment.

FIG. 5 is a block diagram of a computer system 500 suitable for implementing one or more components in FIG. 1, according to an embodiment. Referring to FIG. 5, an illustrative system 500 including a computer 510 is shown. The computer 510 may be an implementation of a computing system that includes or corresponds to the first user device 102, the second user device 114, the payment provider server 130, and/or the POS device 142 of FIG. 1. The computer 510 includes at least one computer processor (CPU) 514 (e.g., a hardware processor) as well as main memory 502, a memory controller 501, and a non-volatile memory 560. The main memory 502 is connected through a memory bus 508 to the memory controller 501. The memory controller 501 and the non-volatile memory 560 are connected through a second memory bus 516 and a bus adapter 518 to the processor 514 through a processor bus 534.

Stored at the memory 502 are one or more applications 520 that may be module(s) or computer program instructions for carrying out particular tasks (e.g., the merchant application 103, the payment provider application 104, risk analysis application 116, and/or payment processing application 118 of FIG. 1). Also stored at the main memory 502 is an operating system 522. Operating systems include, but are not limited to, UNIX® (a registered trademark of The Open Group), Linux® (a registered trademark of Linus Torvalds), Windows® (a registered trademark of Microsoft Corporation, Redmond, Wash., United States), and others as will occur to those of skill in the art. The operating system 522 and the application 520 in the example of FIG. 5 are shown in the main memory 502, but components of the aforementioned software may also, or in addition, be stored at non-volatile memory (e.g., on data storage, such as data storage 524 and/or the non-volatile memory 560).

The computer 510 includes a disk drive adapter 538 coupled through an expansion bus 540 and the bus adapter 518 to the processor 514 and other components of the computer 510. The disk drive adapter 538 connects non-volatile data storage to the computer 510 in the form of the data storage 524 and may be implemented, for example, using Integrated Drive Electronics ("IDE") adapters, Small Computer System Interface ("SCSI") adapters, Serial Attached SCSI ("SAS") adapters, and others as will occur to those of skill in the art. Non-volatile computer memory also may be implemented as an optical disk drive, electrically erasable programmable read-only memory (so-called "EEPROM" or "Flash" memory), RAM drives, and other devices, as will occur to those of skill in the art. In a particular embodiment, the data storage 524 may store the data and information described herein.

The computer 510 also includes one or more input/output ("I/O") adapters 542 that implement user-oriented input/output through, for example, software drivers and computer hardware for controlling input and output to and from user input devices 544, such as keyboards and mice. In addition, the computer 510 includes a communications adapter 546 for data communications with a data communications network 560. The data communications may be carried out serially through Recommended Standard 232 (RS-232) connections (sometimes referred to as "serial" connections), through external buses such as a Universal Serial Bus ("USB"), through data communications networks such as internet protocol (IP) data communications networks, and in other ways as will occur to those of skill in the art. The communications adapter 546 implements the hardware level of data communications through which one computer sends data communications to another computer, directly or through a data communications network. Examples of the communications adapter 546 suitable to use in the computer 510 include, but are not limited to, modems for wired dial-up communications, Ethernet (Institute of Electrical and Electronics Engineers (IEEE) 802.3) adapters for wired network communications, and IEEE 802.11 adapters for wireless network communications. The computer 510 also includes a display adapter 532 that facilitates data communication between the bus adapter 518 and a display device 530, enabling the application 520 to visually present output on the display device 530.

In various embodiments of the present disclosure, execution of instruction sequences to practice the present disclosure may be performed by computer system 500. In various other embodiments of the present disclosure, a plurality of computer systems 500 coupled by communications adapter 546 to the network (e.g., such as a LAN, WLAN, and/or various other wired or wireless networks, including telecommunications, mobile, and cellular phone networks) may perform instruction sequences to practice the present disclosure in coordination with one another.

Particular embodiments described herein may take the form of an entirely hardware embodiment, an entirely software embodiment, or an embodiment containing both hardware and software elements. In a particular embodiment, the disclosed methods are implemented in software that is embedded in processor readable storage medium or storage device and executed by a processor that includes but is not limited to firmware, resident software, microcode, etc.

Further, embodiments of the present disclosure, may take the form of a computer program product accessible from a computer-usable or computer-readable storage device providing program code (e.g., computer-executable instructions) for use by or in connection with a computer, processor, or any instruction execution system. For the purposes of this description, a computer-usable or computer-readable storage device may be non-transitory and can be any apparatus that can tangibly embody a computer program and that can contain, store, communicate, propagate, or transport the program for use by or in connection with the instruction execution system, processor, apparatus, or device.

In various embodiments, the medium can include an electronic, magnetic, optical, electromagnetic, infrared, or semiconductor system (or apparatus or device) or a propagation medium. Examples of a computer-readable storage device include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and digital versatile disk (DVD).

A data processing system suitable for storing and/or executing program code may include at least one processor coupled directly or indirectly to memory elements through a system bus. The memory elements can include local memory employed during actual execution of the program code, bulk storage, and cache memories that may provide temporary or more permanent storage of at least some program code in order to reduce the number of times code must be retrieved from bulk storage during execution.

Input/output or I/O devices (including but not limited to keyboards, displays, pointing devices, etc.) can be coupled to the data processing system either directly or through intervening I/O controllers. Network adapters may also be coupled to the data processing system to enable the data processing system to become coupled to other data processing systems or remote printers or storage devices through intervening private or public networks. Modems, cable modems, and Ethernet cards are just a few of the currently available types of network adapters.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and features as defined by the following claims.

What is claimed is:

1. A system, comprising:
one or more hardware processors; and
a memory storing computer-executable instructions, that in response to execution by the one or more hardware processors, causes the system to perform operations comprising:
   determining an online integration by the system with a social media platform utilized by a first user through a social media account;
   identifying a social media post by the first user using the social media account, wherein the social media post comprises a merchant designated for a visit by the first user;
   causing to be displayed, via the social media platform by the system, a user interface with the social media post that allows a second user to provide a request to purchase items from the merchant remotely through the social media post, wherein the first user purchases the items on behalf of the second user;
   receiving, from the second user via the user interface provided by the system, the request for the first user to purchase a first item from the items at the merchant on behalf of the second user, and the request including identification information associated with the first user;
   transmitting a communication to an application on a first user device, wherein the application provides a payment processing functionality to purchase the first item using an account of the first user with the system;
   determining that the first user device is unresponsive to the communication in the application;
   determining, based on the determining that the first user device is unresponsive and the social media post, that the first user device corresponding to the first user is offline;
   determining that the payment processing functionality of the application is unavailable to purchase the first item based on determining that the first user device is offline;
   determining item information for the first item based at least on the request received via the user interface displayed with the social media post;
   in response to the determining, generating a payment token corresponding to the request for the first user to purchase the first item at a merchant location of the merchant based on the item information;
   storing the payment token and an association between the payment token and the account of the first user;
   subsequent to the storing, receiving, from a point-of-sale (POS) device associated with the merchant, a checkout request for the first user to purchase one or more other items sold by the merchant;
   accessing the account of the first user based on authentication information included in the checkout request;
   identifying the payment token based on the association between the payment token and the account of the first user;
   enabling the payment processing functionality to purchase the first item via the POS device using the account of the first user when the first user device is offline; and
   based on information included in the payment token, causing the POS device to display a request for the first user to add the first item for purchase in addition to the one or more other items.

2. The system of claim 1, wherein the request for the first user to purchase the first item on behalf of the second user is received, from a second user device corresponding to the second user, via a message service of the system integrated with the social media platform, and wherein the messaging service uses at least one of an instant message, a text message, or the social media post.

3. The system of claim 1, wherein the identification information comprises at least one of an account identifier associated with the account of the first user, a name of the first user, and electronic mail address of the first user, or a phone number of the first user.

4. The system of claim 1, wherein the payment token comprises at least one of identification information associated with the second user, the identification information associated with the first user, a product identifier associated with the first item, merchant identification information associated with the merchant, or location information associated with the merchant location.

5. The system of claim 1, wherein the operations further comprise:
receiving, from the POS device, an affirmative indication to add the first item for purchase in addition to the one or more other items; and
processing payment of the first item and the one or more other items using a payment method associated with the account of the first user.

6. The system of claim 1, wherein the determining that the first user device is offline further comprises:
receiving, from the first user device, a low-power indication that the first user device is to be deactivated within a predetermined amount of time; and
determining that an elapsed time since receiving the low-power indication has exceeded the predetermined amount of time.

7. The system of claim 1, wherein the determining that the first user device is offline further comprises attempting to transmit, to the first user device, the request for the first user to purchase the first item a predetermined number of times without receiving an acknowledgement from the first user device.

8. The system of claim 1, wherein the operations further comprise:
receiving an indication that the first user has declined to add the first item for purchase; and
transmitting a notification to a second user device corresponding to the second user that the first user has declined the request for the first user to purchase the first item on behalf of the second user.

9. The system of claim 1, wherein the authentication information comprises at least one of biometric information associated with the first user, username and password information associated with the first user, or payment information associated with the first user.

10. The system of claim 1, wherein the operations further comprise:
determining that token information included in the payment token matches identification information corresponding to the POS device, wherein the causing the POS device to display the request is performed in response to the determining.

11. A method, comprising:
determining an online integration by a payment provider server with a social media platform utilized by a first user through a social media account;
identifying a social media post by the first user using the social media account, wherein the social media post comprises a first merchant designated for a visit by the first user;
causing to be displayed, via the social media platform by the payment provider server, a user interface with the social media post that allows at least one additional user to provide a purchase request to purchase one or more additional items from the first merchant remotely through the social media post, wherein the first user purchases the items on behalf of the at least one additional user;
receiving, by the payment provider server of a payment provider from a point-of-sale (POS) device associated with the first merchant at a merchant location, a checkout request for the first user to purchase one or more items sold by the first merchant;
transmitting at least a communication to an application on a first user device of the first user from the payment provider server, wherein the application provides a payment processing functionality to purchase the one or more additional items using an account of the first user with the payment provider server;
determining that the first user device is unresponsive to the communication in the application;
determining, based on the determining that the first user device is unresponsive and the social media post, that the first user device corresponding to the first user is offline;
determining that the payment processing functionality of the application is unavailable to purchase the one or more additional items based on determining that the first user device is offline;
in response to determining that the first user device is unresponsive and offline, accessing the account of the first user with the payment provider based on authentication information included in the checkout request;
identifying a previously stored payment token that is associated with the account of the first user, the previously stored payment token indicating the one or more additional items for potential purchase and including item information for the one or more additional items from at least one the purchase request received via the user interface displayed with the social media post;
enabling the payment processing functionality to purchase the one or more additional items via the POS device using the account of the first user when the first user device is offline; and
in response to the identifying, transmitting instructions to the POS device that cause the POS device to display a request for the first user to add at least one of the one or more additional items for potential purchase for checkout at the merchant location.

12. The method of claim 11, wherein the previously stored payment token corresponds to the purchase request of a second user for the first user to purchase the one or more additional items for potential purchase on behalf of the second user.

13. The method of claim 11, wherein the previously stored payment token further comprises content of a shopping cart that the first user is maintaining with a second merchant.

14. The method of claim 13, wherein the second merchant is the same as the first merchant.

15. The method of claim 13, wherein the second merchant is different from the first merchant, and the content is sold by the second merchant.

16. The method of claim 15, further comprising:
determining a subset of the one or more additional items for potential purchase that are also sold by the first merchant at the merchant location, wherein the subset of the one or more additional items for potential purchase is displayed by the POS device is included in the subset.

17. A non-transitory computer readable medium storing computer-executable instructions that in response to execution by one or more hardware processors, causes a payment provider server of a payment provider to perform operations comprising:
determining an online integration by the payment provider server with a social media platform utilized by a first user through a social media account;

identifying a social media post by the first user using the social media account, wherein the social media post comprises a first merchant designated for a visit by the first user;

causing to be displayed, via the social media platform by the payment provider server, a user interface with the social media post that allows at least one additional user to provide a purchase request to purchase one or more additional items from the first merchant remotely through the social media post, wherein the first user purchases the items on behalf of the at least one additional user;

receiving, from a point-of-sale (POS) device associated with the first merchant at a merchant location, a checkout request for the first user to purchase one or more items sold by the first merchant;

transmitting at least a communication to an application on a first user device of the first user from the payment provider server, wherein the application provides a payment processing functionality to purchase the one or more additional items using an account of the first user with the payment provider server;

determining that the first user device is unresponsive to the communication in the application;

determining, based on the determining that the first user device is unresponsive and the social media post, that the first user device corresponding to the first user is offline;

determining that the payment processing functionality of the application is unavailable to purchase the one or more additional items based on determining that the first user device is offline;

in response to determining that the first user device is unresponsive and offline, accessing the account of the first user with the payment provider based on authentication information included in the checkout request;

identifying a previously stored payment token that is associated with the account of the first user, the previously stored payment token indicating the one or more additional items for potential purchase and including item information for the one or more additional items from at least on the purchase request received via the user interface displayed with the social media post;

enabling the payment processing functionality to purchase the one or more additional items via the POS device using the account of the first user when the first user device is offline; and in response to the identifying, transmitting instructions to the POS device that cause the POS device to display a request for the first user to add at least one of the one or more additional items for potential purchase for checkout at the merchant location.

18. The non-transitory computer readable medium of claim 17, wherein the previously stored payment token corresponds to the purchase request of a second user for the first user to purchase the one or more additional items for potential purchase on behalf of the second user.

19. The non-transitory computer readable medium of claim 17, wherein the previously stored payment token further comprises content of a shopping cart that the first user is maintaining with a second merchant.

20. The non-transitory computer readable medium of claim 19, wherein the second merchant is different from the first merchant, and the operations further comprise:

determining a subset of the one or more additional items for potential purchase that are also sold by the first merchant at the merchant location, wherein the subset of the one or more additional items for potential purchase is displayed by the POS device is included in the subset.

\* \* \* \* \*